US009495781B2

(12) United States Patent
Lum et al.

(10) Patent No.: US 9,495,781 B2
(45) Date of Patent: Nov. 15, 2016

(54) EARLY SAMPLE EVALUATION DURING COARSE RASTERIZATION

(75) Inventors: Eric Lum, San Jose, CA (US); Walter R. Steiner, Flagler Beach, FL (US); Justin Cobb, Toney, AL (US)

(73) Assignee: NVIDIA Corporation, Santa Clara, CA (US)

( * ) Notice: Subject to any disclaimer, the term of this patent is extended or adjusted under 35 U.S.C. 154(b) by 287 days.

(21) Appl. No.: 13/529,295

(22) Filed: Jun. 21, 2012

(65) Prior Publication Data

US 2013/0342547 A1     Dec. 26, 2013

(51) Int. Cl.
*G06T 15/40* (2011.01)
*G06T 11/40* (2006.01)
*G06T 15/00* (2011.01)

(52) U.S. Cl.
CPC ............ *G06T 11/40* (2013.01); *G06T 15/005* (2013.01)

(58) Field of Classification Search
None
See application file for complete search history.

(56) References Cited

U.S. PATENT DOCUMENTS

| 6,476,807 B1* | 11/2002 | Duluk, Jr. | G06T 1/60 345/421 |
| 7,375,727 B1* | 5/2008 | Greene et al. | 345/422 |
| 7,400,325 B1* | 7/2008 | Gimby | G06T 15/40 345/418 |
| 7,804,499 B1* | 9/2010 | Molnar | G06T 15/005 345/422 |
| 7,808,512 B1* | 10/2010 | Hutchins | G09G 3/3611 345/620 |
| 7,952,579 B1* | 5/2011 | Greene et al. | 345/422 |
| 2004/0246251 A1* | 12/2004 | Fenney et al. | 345/426 |
| 2005/0285850 A1* | 12/2005 | Heim et al. | 345/418 |
| 2006/0170690 A1* | 8/2006 | Leather | 345/506 |
| 2007/0296725 A1* | 12/2007 | Steiner et al. | 345/505 |

* cited by examiner

*Primary Examiner* — Barry Drennan
*Assistant Examiner* — Khoa Vu
(74) *Attorney, Agent, or Firm* — Artegis Law Group, LLP

(57) ABSTRACT

A technique for early sample evaluation during coarse rasterization of primitives reduces the number of pixel tiles that are processed during fine rasterization of the primitive. A primitive bounding box determines when a primitive is small and may not actually cover any samples within at least one fine raster tile. Early sample evaluation is performed for the small primitive during coarse rasterization and the small primitive is discarded when no samples are actually covered by the small primitive. When the small primitive lies on a boundary between at least two fine raster tiles, early sample evaluation is performed during coarse rasterization to correctly identify which, if any, of the at least two fine raster tiles includes samples that are actually covered by the small primitive.

22 Claims, 11 Drawing Sheets

EARLY SAMPLE EVALUATION DURING COARSE RASTERIZATION

BACKGROUND OF THE INVENTION

Field of the Invention

The present invention generally relates to graphics processing and more specifically to early sample evaluation during coarse rasterization of primitives.

Description of the Related Art

Conventional graphics processing pipelines perform rasterization of primitives in two stages. The first stage is coarse rasterization that identifies one or more pixel tiles in screen space that are covered by a primitive. The second stage is fine rasterization. During fine rasterization, the pixel tiles identified during coarse rasterization are processed to determine which samples are covered by the primitive.

One drawback to such an approach is that small primitives may be identified by the coarse rasterizer as covering a pixel tile when, in fact, no samples within the pixel tile are actually covered by those small primitives. For example, when a small primitive lies on a boundary between two pixel tiles, the small primitive may be identified by the coarse rasterizer as covering two pixel tiles when, in fact, samples may only be covered within one of the two pixel tiles. Therefore, the fine rasterizer processes some pixel tiles that do not actually include even at least one covered sample. Processing pixel tiles that do not include a visible portion or a primitive is undesirable.

Accordingly, what is needed in the art is an approved approach for identifying pixel tiles that are covered by small primitives during coarse rasterization.

SUMMARY OF THE INVENTION

One embodiment of the present invention sets forth a system and method for rasterizing primitives including receiving a bounding box that entirely encloses a primitive, determining that the primitive is small based on dimensions of the bounding box, and computing per-sample coverage for the small primitive. The technique determines whether at least one sample is covered by the small primitive according to the per-sample coverage. If at least one sample is covered by the small primitive, then coarse raster information is computed for at least one coarse raster tile based on the per-sample coverage. If no sample is covered by the small primitive, then the small primitive is discarded.

One advantage of the disclosed rasterization technique is that small primitives that do not cover any samples are discarded during coarse rasterization. When a small primitive lies on a boundary between coarse and/or fine raster tiles and only covers samples within one of the two fine raster tiles, the coarse rasterizer correctly identifies that only one of the two fine raster tiles should be processed by a fine rasterizer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

A technique for early sample evaluation during coarse rasterization of primitives reduces the number of pixel tiles that are processed during fine rasterization of the primitive. A primitive bounding box determines when a primitive is small and may not actually cover any samples within at least one fine raster tile. Early sample evaluation is performed for the small primitive during coarse rasterization and the small primitive is discarded when no samples are actually covered by the small primitive. When the small primitive lies on a boundary between at least two fine raster tiles, early sample evaluation is performed during coarse rasterization to correctly identify which, if any, of the at least two fine raster tiles includes samples that are actually covered by the small primitive.

System Overview

Figure 1:
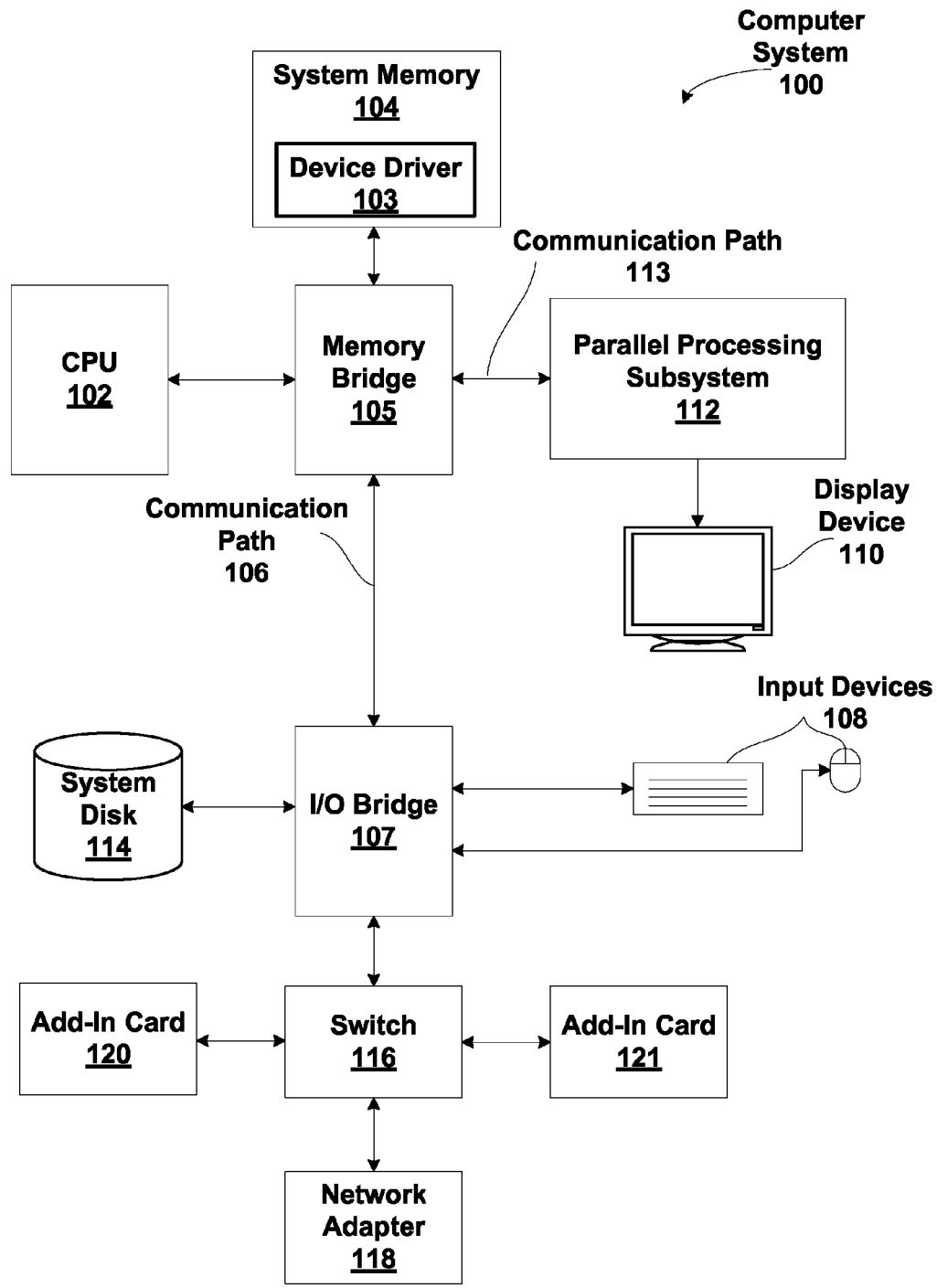
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
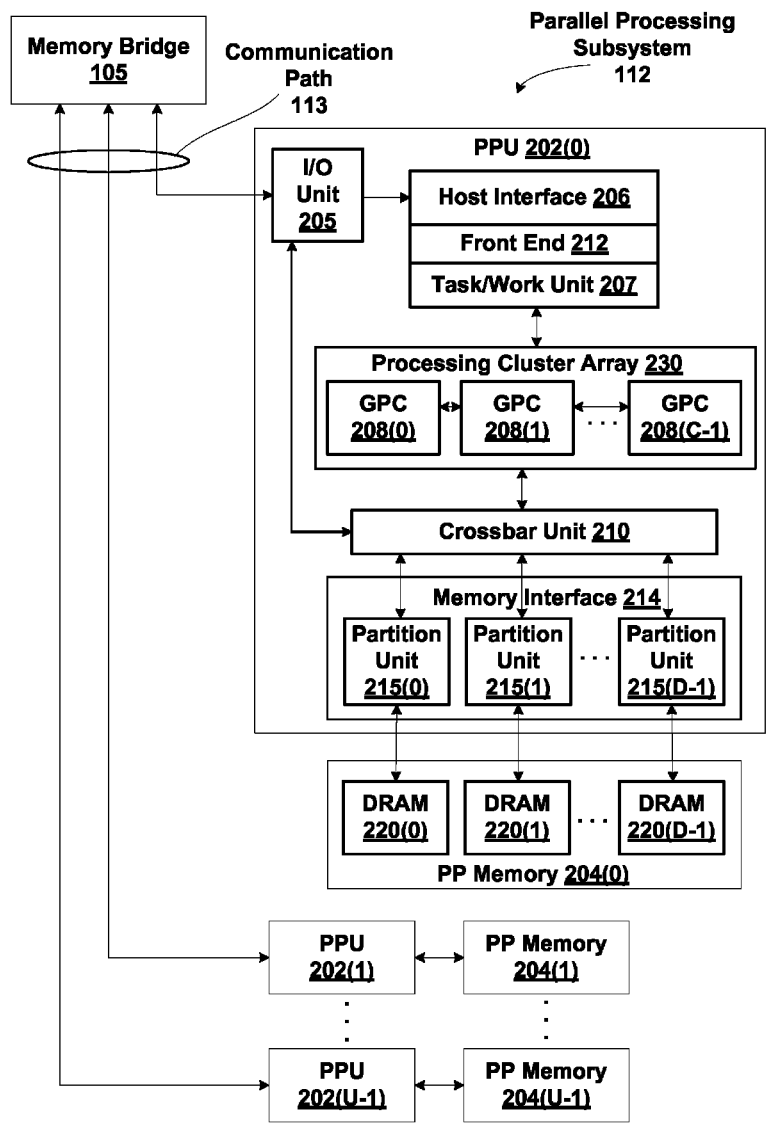
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
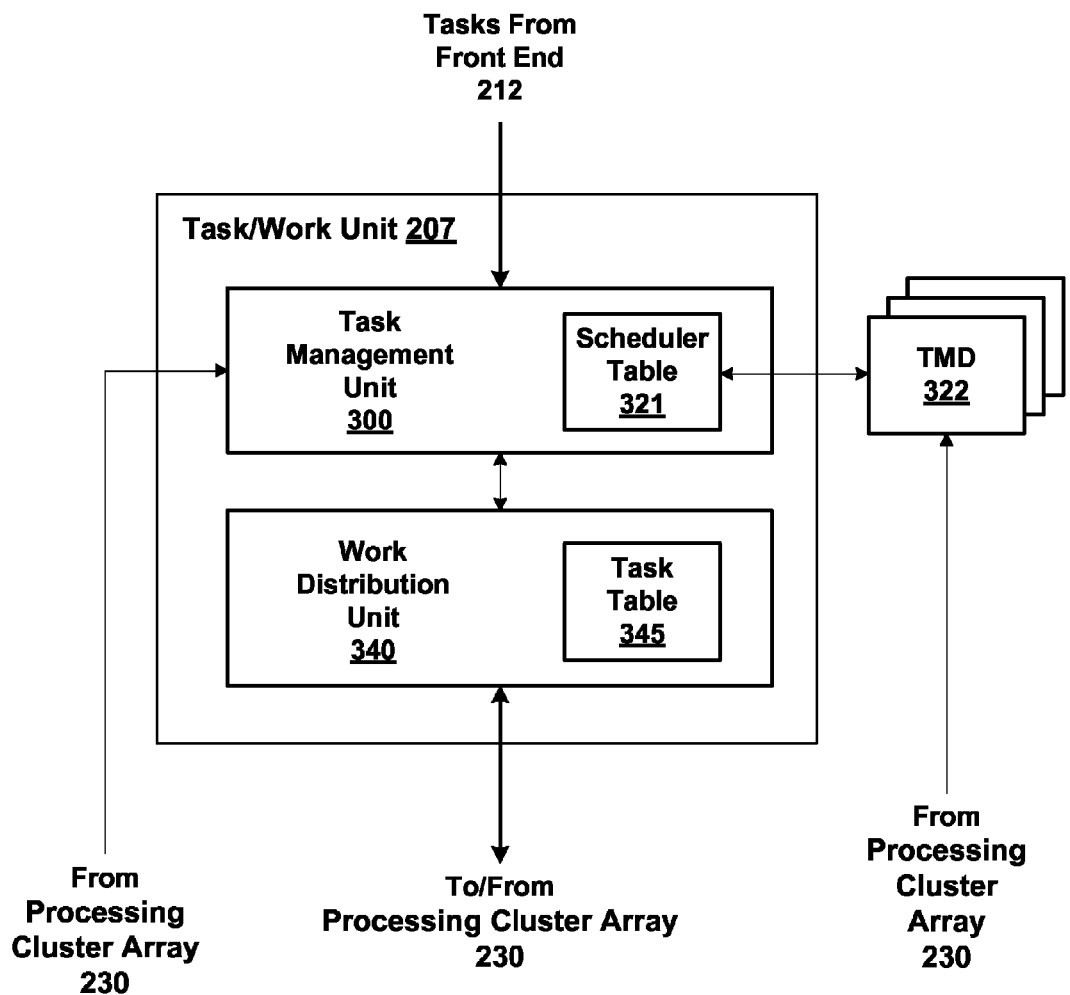
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks before scheduling the tasks. The collected tasks may then be scheduled, based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to the list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
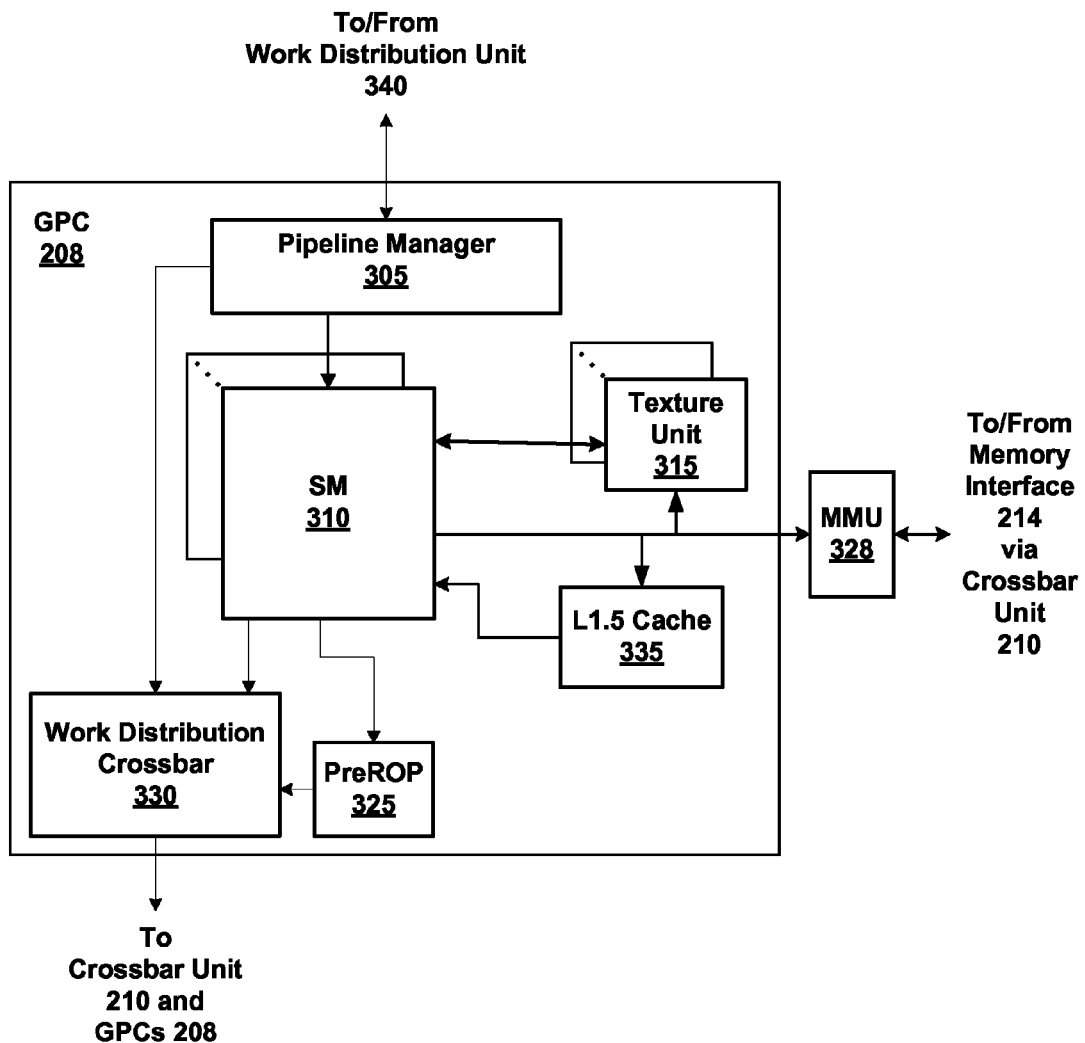
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 contains a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104.

It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache that is shared between all GPCs 208, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
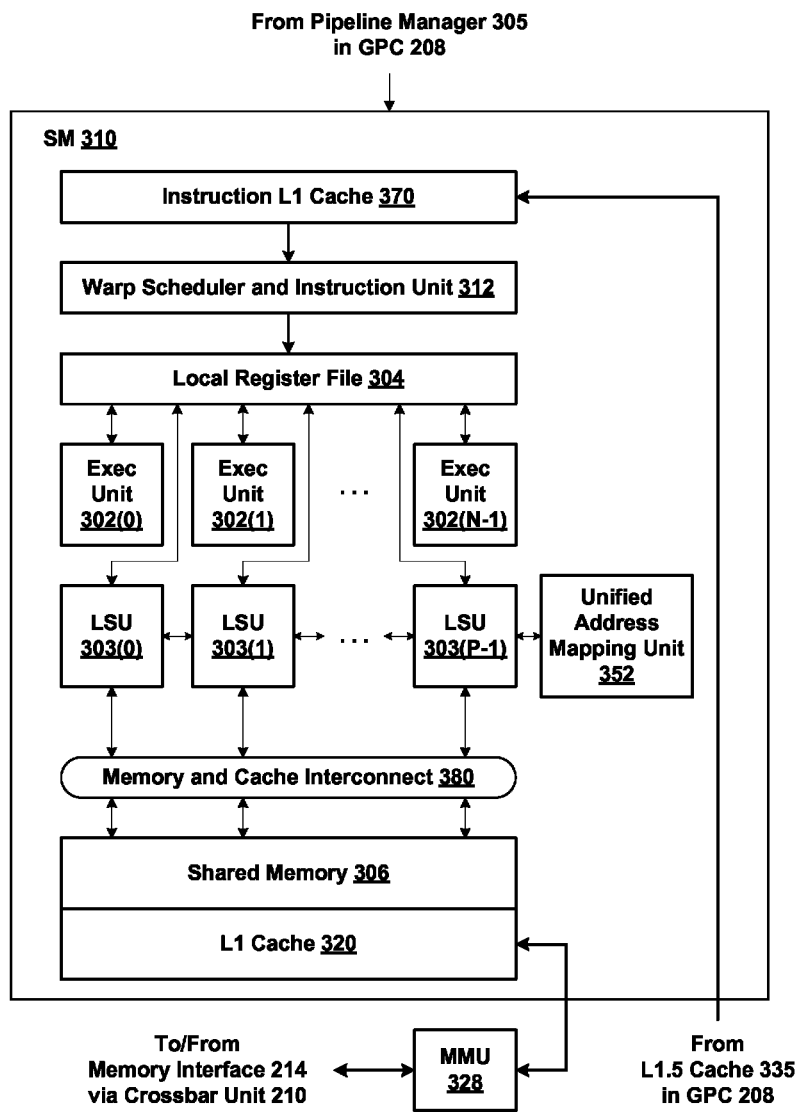
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Graphics Pipeline Architecture

Figure 4:
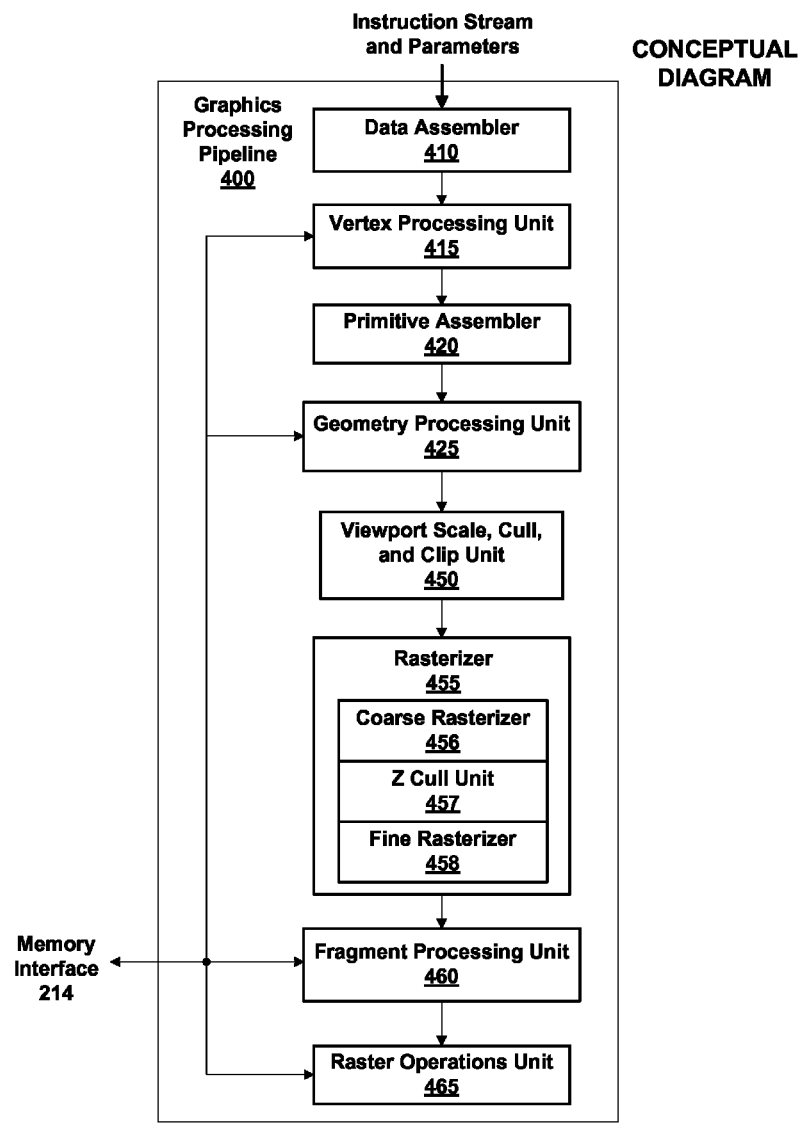
FIG. 4 is a conceptual diagram of a graphics processing pipeline that one or more of the parallel processing units of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. The rasterizer 455 includes a coarse rasterizer 456, z cull unit 457, and a fine rasterizer 458. The coarse rasterizer 456 determines which coarse raster tiles may be covered by each graphics primitive based on a primitive bounding box that fully encloses the primitive. Coarse raster tiles that are intersected by the primitive bounding box may include a pixel that is covered by the graphics primitive. Screen space is divided into several non-overlapping coarse raster tiles such that each pixel is included in one and only one coarse raster tile. Each coarse raster tile is divided into two or more non-overlapping fine raster tiles such that each pixel is also included in one and only one fine raster tile. In one embodiment, the coarse raster tile is 16×16 pixels and the fine raster tile is 8×8 pixels so that each coarse raster tile includes 4 fine raster tiles.

The output of the coarse rasterizer 456 is coarse raster tile coverage information specifying at least which fine raster tiles are intersected by the primitive bounding box. The z cull unit 457 may be configured to perform z culling and other z-based optimizations for fine raster tiles that are intersected by the primitive bounding box. The fine rasterizer 458 determines per-sample coverage information, i.e., fine coverage coverage information, for each fine raster tile that may included a sample within the primitive, according to the coarse raster tile coverage information.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Early Sample Evaluation During Coarse Rasterization

Hierarchical rasterizers, such as the rasterizer 455, employ a fast coarse rasterizer to identify which fine raster tiles may include samples that are covered by a primitive. Hierarchical rasterizers allow for z culling at the fine raster tile granularity so that primitives (or portions of primitives) that will not be visible are not processed by the fine rasterizer. The coarse rasterizer 456 is configured to perform early sample evaluation for small primitives to further reduce the number of fine raster tiles that are processed compared with conventional hierarchical rasterizers. The early sample evaluation may reduce the number of fine raster tiles that are processed by the fine rasterizer 458 when a primitive bounding box for a small primitive crosses a fine raster tile boundary so that at least two fine raster tiles would be processed by the fine rasterizer 458 and no samples are covered by the small primitive in at least one of the two fine raster tiles. Assuming that the coarse rasterizer 456 processes a coarse raster tile each clock cycle and the fine rasterizer 458 processes a fine raster tile each clock cycle, rasterization performance for small primitives having a bounding box intersecting two fine raster tiles, but that only cover samples in one of the two fine raster tiles may be doubled when the coarse rasterizer 456 performs early sample evaluation.

Figure 5A:
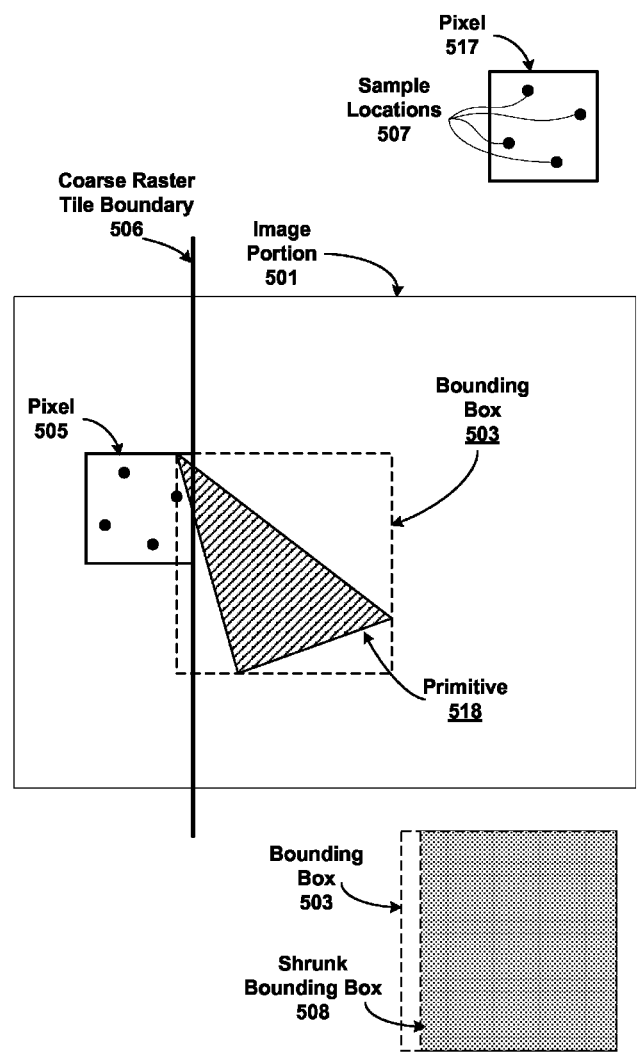
FIG. 5A is a diagram illustrating bounding box and a small primitive crossing a coarse raster tile boundary, according to one embodiment of the present invention.

FIG. 5A is a diagram illustrating bounding box 503 and a small primitive 518 crossing a fine raster tile boundary 506, according to one embodiment of the present invention. Fine raster tile boundary 506 may also be a coarse raster tile boundary. As shown in the upper right of FIG. 5A, each pixel 517 includes four sample locations 507. The pixel 517 is considered covered when at least one of the four sample locations 507 is covered by a primitive. A pixel 517 includes at least one sample location and may include fewer or more than the four sample locations 507. A sampling mode specifies the number of samples and a location of each sample within a pixel.

As shown in FIG. 5A, a screen space primitive bounding box 503 is computed that completely encompasses the extents of the primitive 518. The primitive bounding box 503 crosses the fine raster tile boundary 506 and intersects two fine raster tiles. The pixel 505 within a first fine raster tile is intersected by the primitive bounding box 503, but no samples within the pixel 505 are covered by the primitive 518. Rather than generate a coarse raster tile mask that indicates the first fine raster tile should be processed by the fine rasterizer 458, the coarse rasterizer 456 performs early sample evaluation for the small primitive 518 and determines that no samples within the first fine raster tile that are also within the bounding box 503 are covered by the primitive 518. Therefore, the coarse rasterizer 456 does not indicate that the first fine raster tile should be processed by the fine rasterizer 458 to determine the sample coverage of the primitive 518 for a second fine raster tile.

The coarse rasterizer 456 determines that the primitive 518 is a small primitive based on the dimensions of the primitive bounding box 503. Specifically, when the area of the primitive bounding box 503 is less than or equal to a predetermined number of pixels, the primitive is considered to be small. In one embodiment, the predetermined number of pixels is four, such that a primitive bounding box having dimensions in pixels that are less than or equal to 2×2, 4×1, or 1×4 is considered to be a small primitive. The predetermined number of pixels may be defined as a sub-tile and the coarse rasterizer 456 performs early sample evaluation within the single sub-tile to compute per-sample coverage within the sub-tile. The coarse raster tile coverage information computed by the coarse rasterizer 456 is based on the per-sample coverage and indicates which fine raster tile(s) within each coarse raster tiles will be processed for the small primitive.

The coarse rasterizer 456 effectively shrinks the primitive bounding box 503 based on the per-sample coverage to generate a shrunk bounding box 508 as shown as the fill pattern within the bounding box 503 of FIG. 5A. Notice that the left side of the primitive bounding box 503 is snapped to the coarse raster tile boundary 506 to generate the shrunk bounding box 508. Importantly, when the coarse rasterizer 456 uses the primitive bounding box 503 without performing early sample evaluation, both the first fine raster tile and the second fine raster tile are processed by the fine rasterizer 458 to compute per-sample coverage. In contrast, when the coarse rasterizer 456 uses the shrunk bounding box 508, i.e., performs early sample evaluation, only the second fine raster tile is processed by the fine rasterizer 458 to compute per-sample coverage.

Figure 5B:
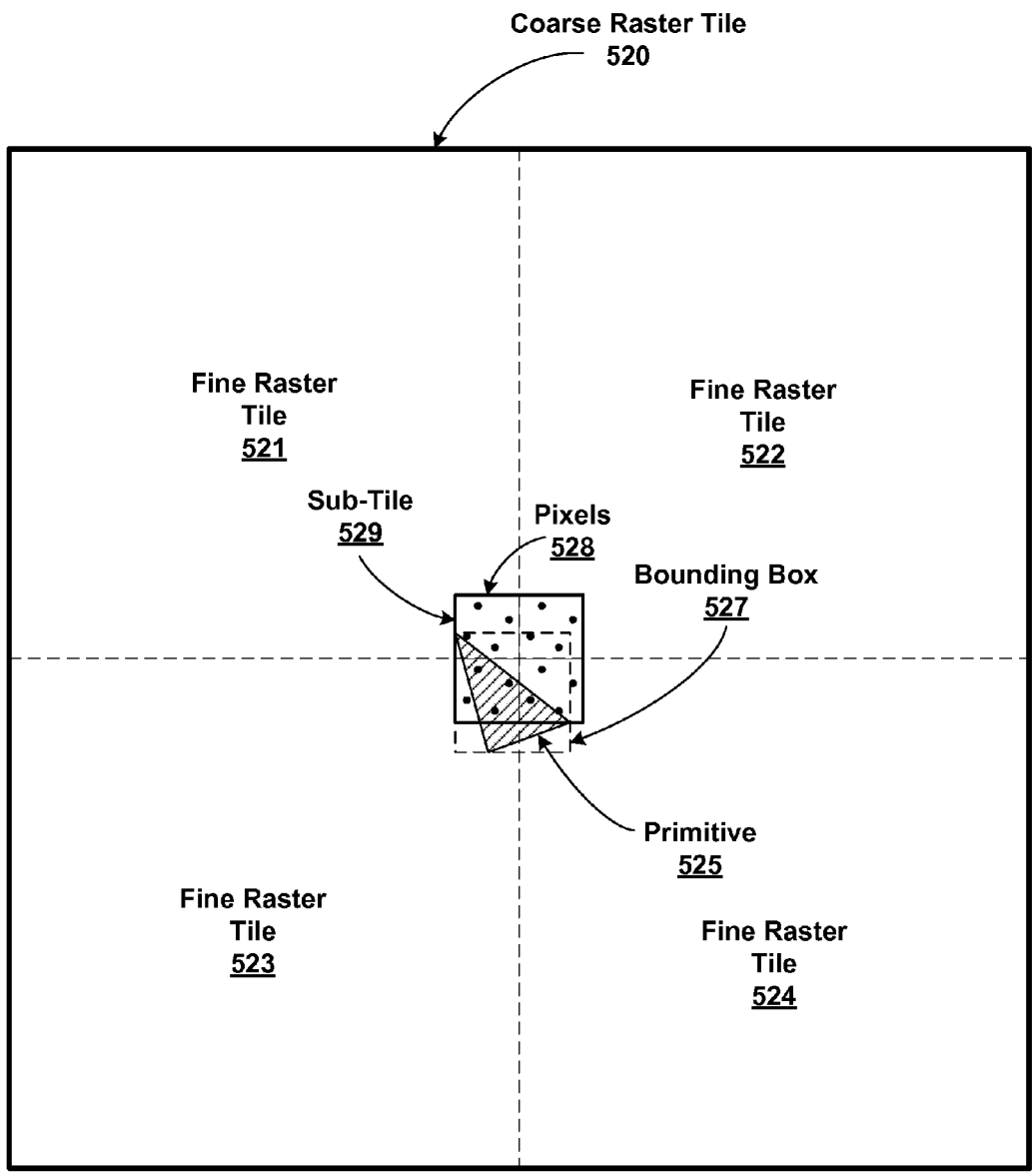
FIG. 5B is a diagram illustrating bounding box and a small primitive crossing a fine raster tile boundaries, according to one embodiment of the present invention.

FIG. 5B is a diagram illustrating a primitive bounding box 527 and a small primitive 525 crossing fine raster tile boundaries between the fine raster tiles 521, 522, 523, and 524, according to one embodiment of the present invention. A coarse raster tile 520 includes the four fine raster tiles 521, 522, 523, and 524. The primitive bounding box 527 intersects each of the four fine raster tiles, so a conventional coarse rasterizer would generate a coverage mask indicating that all of the four fine raster tiles should be processed by the fine rasterizer to produce sample coverage. However, because the primitive bounding box 527 has dimensions that are less than or equal to the predetermined number of pixels in a sub-tile 529, the coarse rasterizer 456 determines that the primitive 525 is a small primitive. Therefore, the coarse rasterizer 456 computes per-sample coverage within a sub-tile 529, e.g., pixels 528. The per-sample coverage is then used by the coarse rasterizer 456 to generate the coarse raster tile coverage information for the primitive 525 indicating that only the fine raster tiles 523 and 524 need to be processed by the fine rasterizer 458. In some cases, a small primitive may not cover any samples and the coarse rasterizer 456 discards the small primitive and does not generate coarse raster tile coverage information for the small primitive.

Figure 5C:
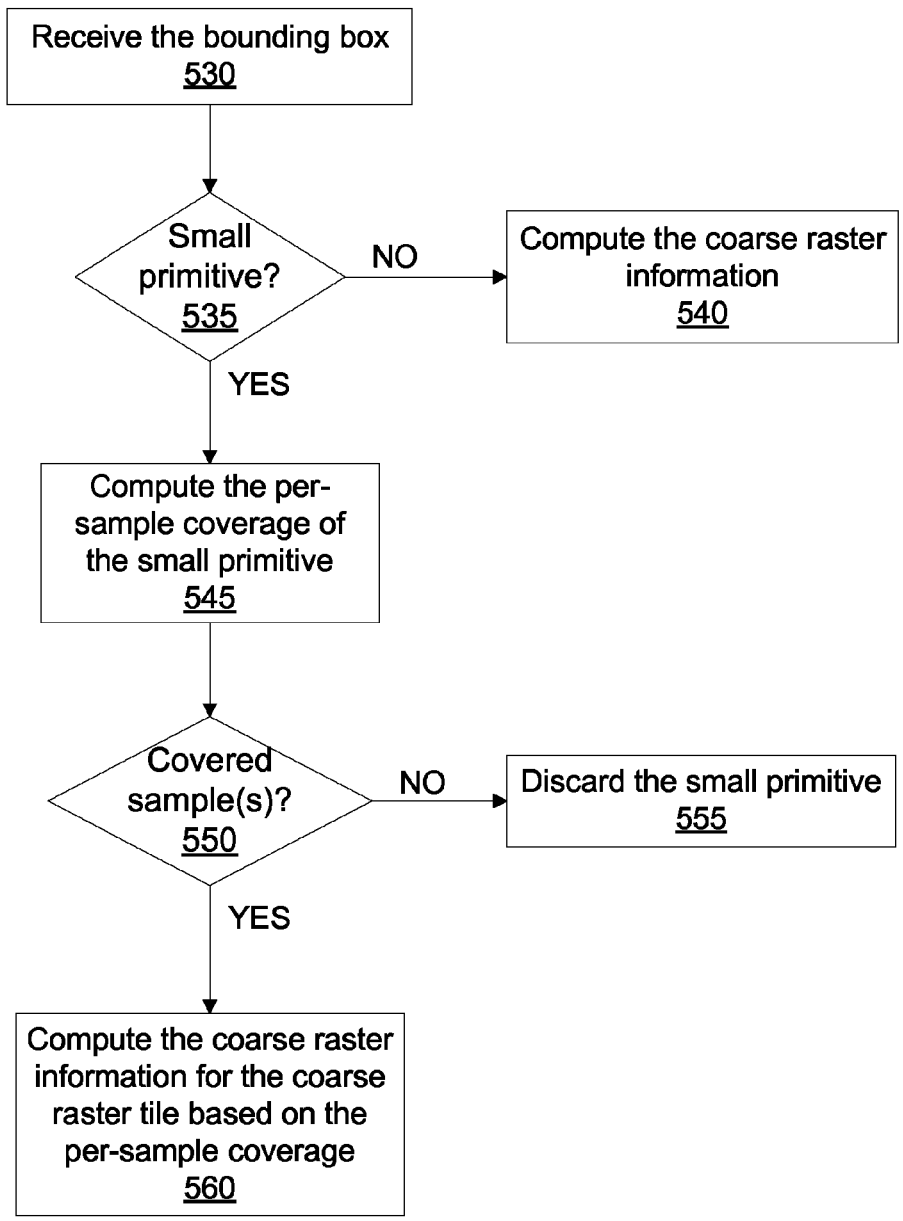
FIG. 5C is a flow diagram of method steps for performing early sampling of primitives during coarse rasterization, according to one embodiment of the present invention.

FIG. 5C is a flow diagram of method steps for performing early sample evaluation for primitives during coarse rasterization, according to one embodiment of the present invention. Although the method steps are described in conjunction with the systems of FIGS. 1, 2, 3A, 3B, 3C, and 4, persons of ordinary skill in the art will understand that any system configured to perform the method steps, in any order, is within the scope of the inventions. At step 530, the coarse rasterizer 456 receives the primitive bounding box that entirely encloses a primitive. The primitive bounding box dimensions may represented in (x,y) screen space coordinates as (xmin, ymin), (xmax, ymax). At step 535, the coarse rasterizer 456 determines, based on dimensions of the primitive bounding box, if the primitive is a small primitive. If, at step 535 the coarse rasterizer 456 determines that the primitive is not a small primitive, then at step 540 the coarse rasterizer 456 computes the coarse raster mask for the coarse raster tile(s) intersected by the primitive bounding box.

If, at step 535 the coarse rasterizer 456 determines that the primitive is a small primitive, then at step 545 the coarse rasterizer 456 computes the per-sample coverage for the small primitive within the sub-tile. At step 550 the coarse rasterizer 456 determines if any samples within the sub-tile are covered according to the per-sample coverage, and, if not, then at step 555 the small primitive is discarded. Otherwise, at step 560 the coarse rasterizer 456 computes the coarse raster information for the coarse raster tile that is intersected by the primitive bounding box according to the per-sample coverage.

Figure 6A:
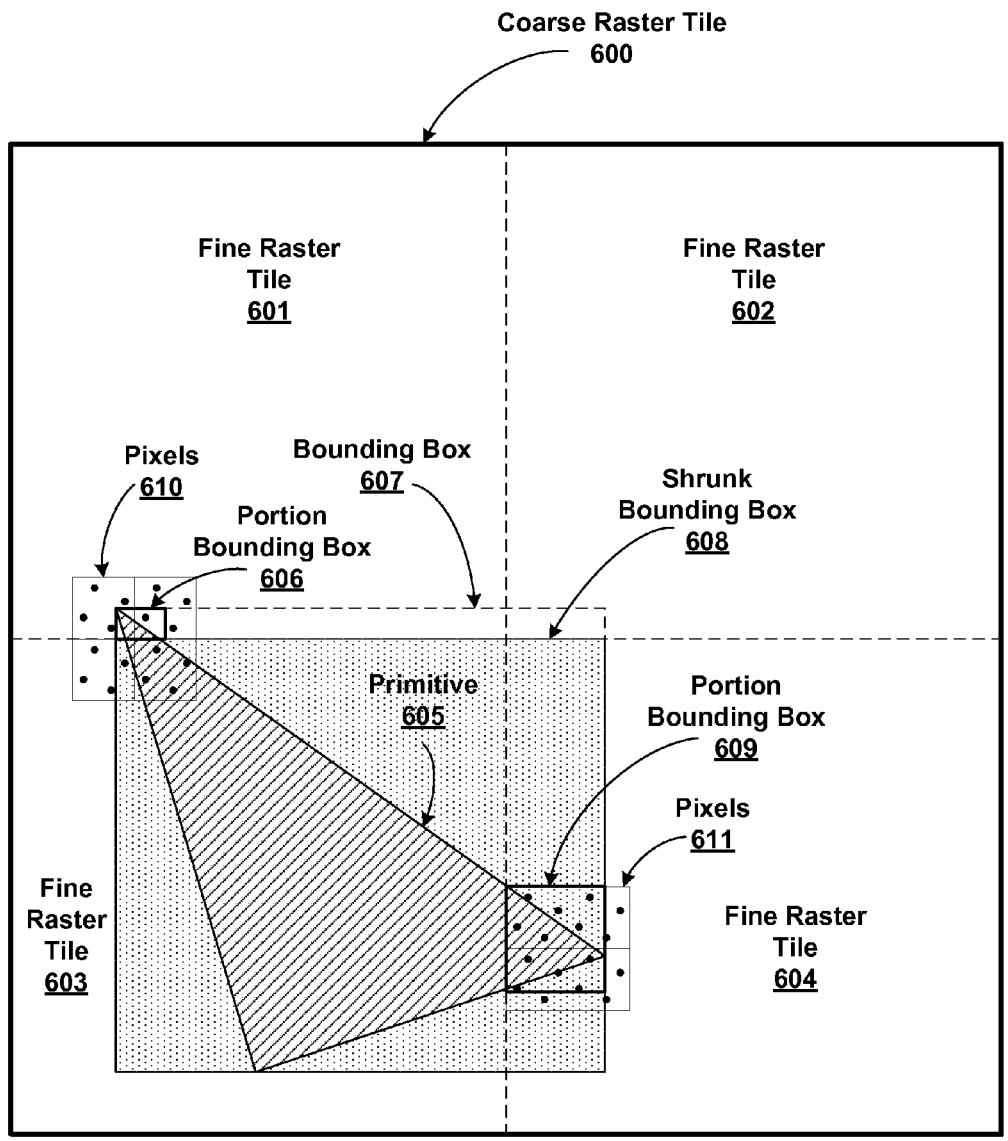
FIG. 6A is a diagram illustrating bounding box and a primitive crossing a fine raster tile boundaries, according to one embodiment of the present invention.

FIG. 6A is a diagram illustrating a primitive bounding box 607 of a primitive 605 that crosses boundaries between fine raster tiles 601, 602, 603, and 604, according to one embodiment of the present invention. A coarse raster tile 600 includes four fine raster tiles 601, 602, 603, and 604. A bounding box 607 entirely encloses the primitive 605. Because the bounding box 607 is larger than the predetermined number of pixels defined as a sub-tile, the primitive 605 is not identified as a small primitive. However, the coarse rasterizer 456 may be configured to perform early sample evaluation for portions of the primitive 605 that intersect each fine raster tile 601, 02, 603, and 604 and that are considered small.

A primitive portion bounding box 606 entirely encloses the portion of primitive 605 intersected with the fine raster tile 601. The primitive portion bounding box 606 is determined by the coarse rasterizer 456 to be small because the primitive portion bounding box 606 is smaller than the sub-tile (the sub-tile includes four pixels). The four pixels 610 that are included within the sub-tile are sampled by the coarse rasterizer 456 to compute the per-sample coverage of the small primitive portion within the primitive portion bounding box 606. The coarse raster coverage information is updated based on the per-sample coverage to indicate that no samples are covered within the fine raster tile 601.

A primitive portion bounding box 609 entirely encloses the portion of primitive 605 intersected with the fine raster tile 604. The primitive portion bounding box 609 is also determined by the coarse rasterizer 456 to be small because the dimensions of the primitive portion bounding box 609 equal the dimensions of the sub-tile. The four pixels 611 that are included within the aligned sub-tile and are sampled by the coarse rasterizer 456 to compute the per-sample coverage of the small primitive portion within the primitive portion bounding box 609. The coarse raster coverage information is updated based on the per-sample coverage to indicate that at least one sample is covered within the fine raster tile 601. The fine rasterizer 468 will process fine raster tiles 603 and 604 for the primitive 605 according to the coarse raster tile information generated by the coarse rasterizer 456. Note that the primitive bounding box 607 is shrunk based on the per-sample coverage for the fine raster tile 601 to generate the shrunk bounding box 608 that does not intersect the fine raster tiles 601 and 602.

Figure 6B:
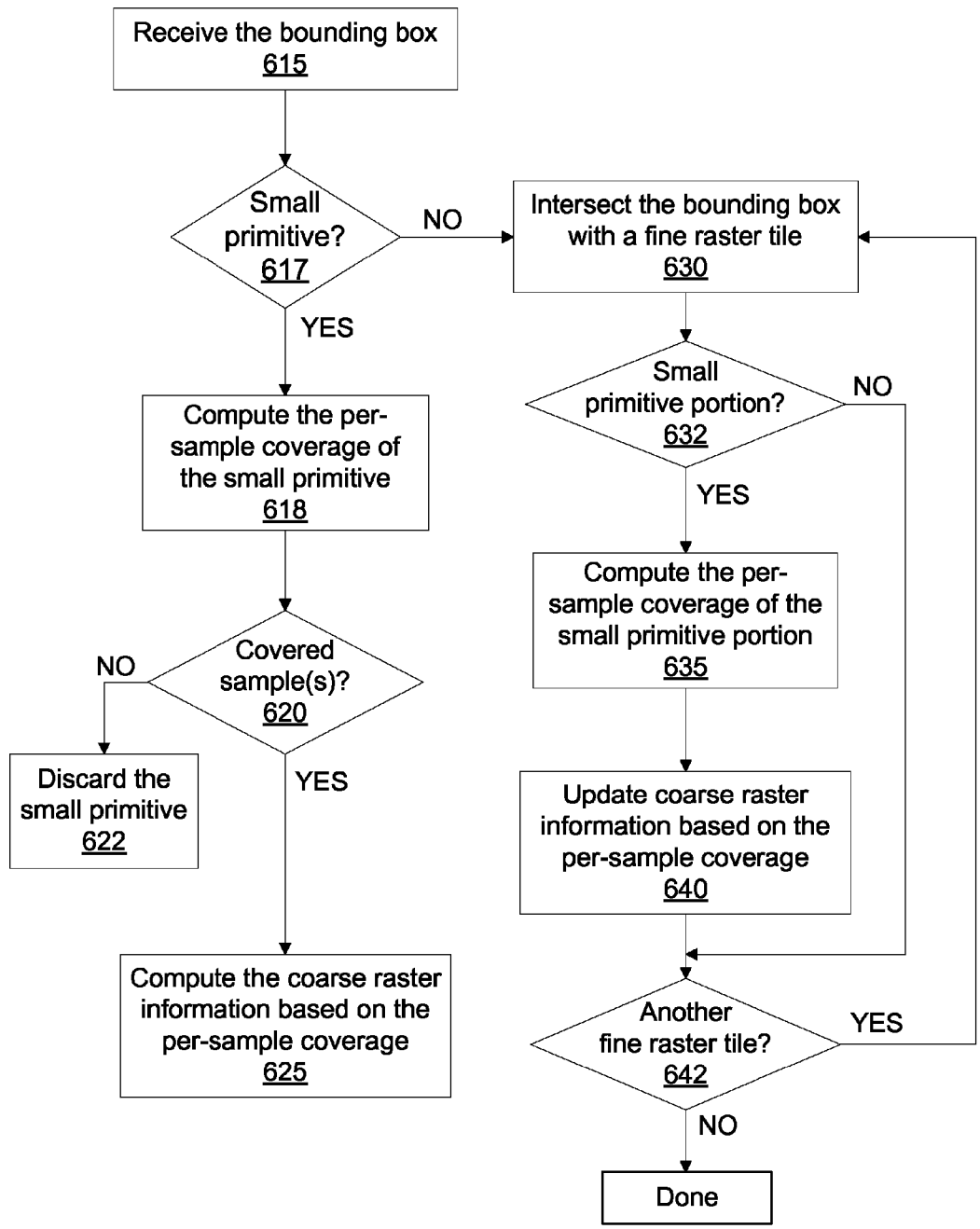
FIG. 6B is another flow diagram of method steps for performing early sampling of primitives during coarse rasterization, according to one embodiment of the present invention.

FIG. 6B is another flow diagram of method steps for performing early sample evaluation during coarse rasterization, according to one embodiment of the present invention. Although the method steps are described in conjunction with the systems of FIGS. 1, 2, 3A, 3B, 3C, and 4, persons of ordinary skill in the art will understand that any system configured to perform the method steps, in any order, is within the scope of the inventions. At step 615, the coarse rasterizer 456 receives the primitive bounding box that entirely encloses a primitive. At step 617, the coarse rasterizer 456 determines, based on dimensions of the primitive bounding box, if the primitive is a small primitive.

If, at step 617 the coarse rasterizer 456 determines that the primitive is a small primitive, then at step 618 the coarse rasterizer 456 computes the per-sample coverage for the small primitive within the sub-tile. At step 620 the coarse rasterizer 456 determines if any samples within the sub-tile are covered according to the per-sample coverage, and, if not, then at step 622 the small primitive is discarded. Otherwise, at step 625 the coarse rasterizer 456 computes the coarse raster information for the coarse raster tile that is intersected by the primitive bounding box according to the per-sample coverage.

If, at step 617 the coarse rasterizer 456 determines that the primitive is not a small primitive, then at step 630 the coarse rasterizer 456 intersects the primitive with a fine raster tile within a coarse raster tile that is intersected by at least one edge of the primitive. Coarse raster tiles that are entirely within the primitive are easily identified by the coarse rasterizer 456 (fully covered coarse raster tiles are not intersected by any of the primitive edges) and the coarse raster tile information for fully covered coarse raster tiles is set without performing early sample evaluation.

If, at step 632 the coarse rasterizer 456 determines that the primitive portion within the fine raster tile is not a small primitive portion, then the coarse rasterizer 456 proceeds to step 642. Otherwise, at step 635 the coarse rasterizer 456 computes the per-sample coverage for the small primitive portion within the sub-tile. At step 640 the coarse rasterizer 456 updates the coarse raster coverage information according to the per-sample coverage. At step 642, the coarse rasterizer 456 determines if another fine raster tile within a partially covered coarse raster tile intersects the primitive, and, if so, the coarse rasterizer returns to step 630 to generate the primitive portion. Otherwise, generation of the coarse raster coverage information by the coarse rasterizer 456 for one or more coarse raster tiles covered by the primitive is done.

In one embodiment, the number of pixels within the sub-tile varies based on the number of edges that intersect the sub-tile. For example, when three edges of a triangle primitive intersect the sub-tile, i.e., as is the case for a small primitive, the size of the sub-tile is four pixels. When two edges of a triangle primitive intersect the sub-tile, i.e., as is the case for the sub-tile shown in FIG. 6A that includes pixels 610 or pixels 611, the size of the sub-tile may be increased to six pixels. Finally, when only one edge of a triangle primitive intersects the sub-tile, the size of the sub-tile may be increased to twelve pixels. The coarse rasterizer 456 includes a sample evaluation unit that is configured to compute per-sample coverage for a sub-tile for a single edge. In one embodiment, the coarse rasterizer 456 is configured to compute per-sample coverage of a triangle primitive for a sub-tile, and three sample evaluation units are employed to generate the per-sample coverage for the sub-tile in a single clock cycle. Therefore, when only a single edge intersects the sub-tile, all three sample evaluation units may be employed to generate the per-sample coverage for a larger sub-tile.

In sum, during coarse rasterization a primitive bounding box determines when a primitive is small and may not actually cover any samples within at least one fine raster tile. Early sample evaluation is performed for the small primitive during coarse rasterization and the small primitive is discarded when no samples are actually covered by the small primitive. When the small primitive lies on a boundary between at least two fine raster tiles, early sample evaluation is performed during coarse rasterization to correctly identify which, if any, of the at least two fine raster tiles includes samples that are actually covered by the small primitive.

One advantage of the systems disclosed herein is that identification of fine raster tiles that are covered by small primitives is determined by sampling the small primitive during coarse rasterization. Therefore, the number of fine raster tiles processed during fine rasterization that do not actually include at least one covered sample is reduced. Furthermore, larger primitives having only a small portion within a fine raster tile are sampled during coarse rasterization to determine whether any samples within the fine raster tile are actually covered by the small portion of the larger primitive. Unnecessary processing of fine raster tiles that do not include at least one covered sample is reduced during fine rasterization for larger primitives have small portions within one or more fine raster tiles.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for rasterizing primitives, comprising:
    receiving a bounding box that entirely encloses a primitive and overlaps a first sample included in a first fine raster tile and a second sample included in a second fine raster tile;
    determining that the primitive is small based on dimensions of the bounding box;
    computing per-sample coverage for the primitive within a sub-tile that overlaps the first fine raster tile and the second fine raster tile, wherein the sub-tile includes a predetermined number of pixels that is less than a number of pixels within either of the first fine raster tile or the second fine raster tile;
    determining that at least one sample within the sub-tile and the first fine raster tile is covered by the primitive according to the per-sample coverage prior to computing fine raster information for the primitive within the first fine raster tile;
    in response to determining that the at least one sample is covered by the primitive within the first fine raster tile, computing fine raster information for the first fine raster tile;
    determining that no sample within the sub-tile and the second fine raster tile is covered by the primitive according to the per-sample coverage prior to computing fine raster information for the primitive within the second fine raster tile; and in response to determining that no sample within the sub-tile and the second fine raster tile is covered by the primitive, determining that fine raster information will not be computed for the primitive within the second fine raster tile.

2. The method of claim 1, further comprising:
receiving a second bounding box that entirely encloses a second primitive; and
generating a small primitive portion of the second primitive by intersecting the second primitive with a third fine raster tile.

3. The method of claim 2, further comprising:
determining that the small primitive portion is small based on dimensions of a primitive portion bounding box that entirely encloses the small primitive portion; and
computing per-sample coverage for the small primitive portion.

4. The method of claim 3, further comprising computing coarse raster information for a coarse raster tile that includes the third fine raster tile based on the per-sample coverage for the small primitive portion.

5. The method of claim 3, further comprising reducing at least one dimension of the second bounding box when no sample is covered by the small primitive portion according to the per-sample coverage for the small primitive portion.

6. The method of claim 1, wherein determining that the primitive is small is also based on a number of edges of the primitive that intersect the sub-tile.

7. The method of claim 1, further comprising reducing at least one dimension of the bounding box based on the per-sample coverage.

8. The method of claim 1, further comprising, in response to determining that the at least one sample is covered by the primitive within the first fine raster tile, computing coarse raster information indicating which fine raster tiles within the coarse raster tile should be processed to compute per-sample coverage for the primitive.

9. The method of claim 1, wherein determining that the primitive is small comprises determining that the bounding box area is not greater than four pixels.

10. The method of claim 1, wherein determining that the primitive is small comprises determining that the bounding box area is not greater than four pixels when three edges of the primitive intersect the coarse raster tile, six pixels when two edges of the primitive intersect the coarse raster tile, and twelve pixels when only one edge of the primitive intersects the coarse raster tile.

11. The computer-implemented method of claim 1, wherein computing the fine raster information comprises determining all of the samples within the first fine raster tile that are covered by the primitive.

12. The computer-implemented method of claim 1, wherein the first fine raster tile is included in a first coarse raster tile and the second fine raster tile is included in a second coarse raster tile.

13. The computer-implemented method of claim 1, wherein computing the per-sample coverage for the primitive within the sub-tile that overlaps the first fine raster tile and the second fine raster tile is performed in response to determining that the primitive is small.

14. A graphics processor, comprising:
a rasterizer configured to:
receive a bounding box that entirely encloses a primitive and overlaps a first sample included in a first fine raster tile and a second sample included in a second fine raster tile;
determine that the primitive is small based on dimensions of the bounding box;
compute per-sample coverage for the primitive within a sub-tile that overlaps the first fine raster tile and the second fine raster tile, wherein the sub-tile includes a predetermined number of pixels that is less than a number of pixels within either of the first fine raster tile or the second fine raster tile;
determine that at least one sample within the sub-tile and the first fine raster tile is covered by the primitive according to the per-sample coverage prior to computing fine raster information for the primitive within the first fine raster tile;
in response to determining that the at least one sample is covered by the primitive within the first fine raster tile, compute fine raster information for the first fine raster tile;
determine that no sample within the sub-tile and the second fine raster tile is covered by the primitive according to the per-sample coverage prior to computing fine raster information for the primitive within the second fine raster tile; and
in response to determining that no sample within the sub-tile and the second fine raster tile is covered by the primitive, determine that fine raster information will not be computed for the primitive within the second fine raster tile.

15. The processing subsystem of claim 14, wherein the rasterizer is further configured to:
receive a second bounding box that entirely encloses a second primitive; and
generate a small primitive portion of the second primitive by intersecting the second primitive with a third fine raster tile.

16. The processing subsystem of claim 15, wherein the rasterizer is further configured to:
determine that the small primitive portion is small based on dimensions of a primitive portion bounding box that entirely encloses the small primitive portion; and
compute per-sample coverage for the small primitive portion.

17. The processing subsystem of claim 16, wherein the rasterizer is further configured to compute coarse raster information for a coarse raster tile that includes the third fine raster tile based on the per-sample coverage for the small primitive portion.

18. The processing subsystem of claim 16, wherein the rasterizer is further configured to reduce at least one dimension of the second bounding box when no sample is covered by the small primitive portion according to the per-sample coverage for the small primitive portion.

19. The processing subsystem of claim 14, wherein the rasterizer is further configured to reduce at least one dimension of the bounding box based on the per-sample coverage.

20. The processing subsystem of claim 14, wherein the rasterizer is further configured to, in response to determining that the at least one sample is covered by the primitive within the first fine raster tile, compute coarse raster information indicating which fine raster tiles within the coarse raster tile should be processed to compute per-sample coverage for the primitive.

21. The processing subsystem of claim 14, wherein the rasterizer is further configured to determine that the primitive is small if the bounding box area is not greater than four pixels.

22. A computing system, comprising:
a graphics processor comprising:

a rasterizer configured to:
- receive a bounding box that entirely encloses a primitive and overlaps a first sample included in a first fine raster tile and a second sample included in a second fine raster tile;
- determine that the primitive is small based on dimensions of the bounding box;
- compute per-sample coverage for the primitive within a sub-tile that overlaps the first fine raster tile and the second fine raster tile, wherein the sub-tile includes a predetermined number of pixels that is less than a number of pixels within either of the first fine raster tile or the second fine raster tile;
- determine that at least one sample within the sub-tile and the first fine raster tile is covered by the primitive according to the per-sample coverage prior to computing fine raster information for the primitive within the first fine raster tile;
- in response to determining that the at least one sample is covered by the primitive within the first fine raster tile, compute fine raster information for the first fine raster tile;
- determine that no sample within the sub-tile and the second fine raster tile is covered by the primitive according to the per-sample coverage prior to computing fine raster information for the primitive within the second fine raster tile; and
- in response to determining that no sample within the sub-tile and the second fine raster tile is covered by the primitive, determine that fine raster information will not be computed for the primitive within the second fine raster tile.

\* \* \* \* \*